United States Patent
Shibata et al.

(10) Patent No.: US 6,959,801 B2
(45) Date of Patent: Nov. 1, 2005

(54) CONVEYANCE APPARATUS

(75) Inventors: Kenichi Shibata, Kariya (JP); Tomoki Sawada, Kariya (JP); Toshio Nii, Osaka (JP); Noboru Shimomura, Osaka (JP); Yasuhiro Miyake, Osaka (JP)

(73) Assignee: Daifuku Co., Ltd., Osaka (JP)

( * ) Notice: Subject to any disclaimer, the term of this patent is extended or adjusted under 35 U.S.C. 154(b) by 42 days.

(21) Appl. No.: 10/777,325

(22) Filed: Feb. 12, 2004

(65) Prior Publication Data

US 2004/0206605 A1 Oct. 21, 2004

(30) Foreign Application Priority Data

Feb. 18, 2003 (JP) ....................... 2003-039052

(51) Int. Cl.⁷ .............................................. B65G 47/24
(52) U.S. Cl. ................... 198/345.3; 198/346.3; 198/345.2
(58) Field of Search ................ 198/346.3, 345.2, 198/345.1, 341.01, 341.08, 346.2, 465.4, 465.1, 465.2, 867.01, 867.08; 29/33 P

(56) References Cited

U.S. PATENT DOCUMENTS

| | | | | |
|---|---|---|---|---|
| 5,505,290 A | * | 4/1996 | Fujii et al. ............... | 198/345.1 |
| 6,089,440 A | * | 7/2000 | Brusha .................... | 228/44.3 |
| 6,155,402 A | * | 12/2000 | Murphy ................... | 198/346.2 |
| 6,196,372 B1 | * | 3/2001 | Rossi ...................... | 198/345.1 |
| 6,419,071 B1 | * | 7/2002 | Oldford et al. .......... | 198/345.3 |
| 6,474,460 B2 | * | 11/2002 | Di Rosa .................. | 198/345.1 |
| 6,557,690 B2 | * | 5/2003 | Oldford et al. .......... | 198/346.3 |

* cited by examiner

Primary Examiner—James R. Bidwell
(74) Attorney, Agent, or Firm—D. Peter Hochberg; Sean Mellino; Katherine R. Vieyra

(57) ABSTRACT

A conveyance apparatus of the present invention includes, on top of a movable body capable of moving along a fixed path, attachable and detachable supporting members capable of supporting a conveyance object prior to processing, and a fixed supporting member capable of supporting the conveyance object after processing in a state where the attachable and detachable supporting members have been detached, and the movable body includes accommodating sections capable of accommodating the attachable and detachable supporting members which has been detached. The conveyance object prior to assembly processing can be conveyed while it is supported by the attachable and detachable supporting members, by using the movable body (common element). In addition, the conveyance object after assembly can be conveyed while it is supported by the fixed supporting member, by detaching the attachable and detachable supporting members and accommodating the same in the accommodating section.

4 Claims, 12 Drawing Sheets

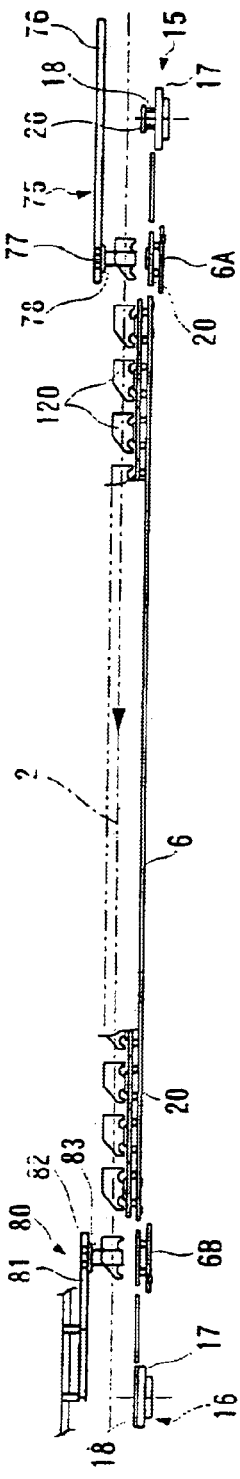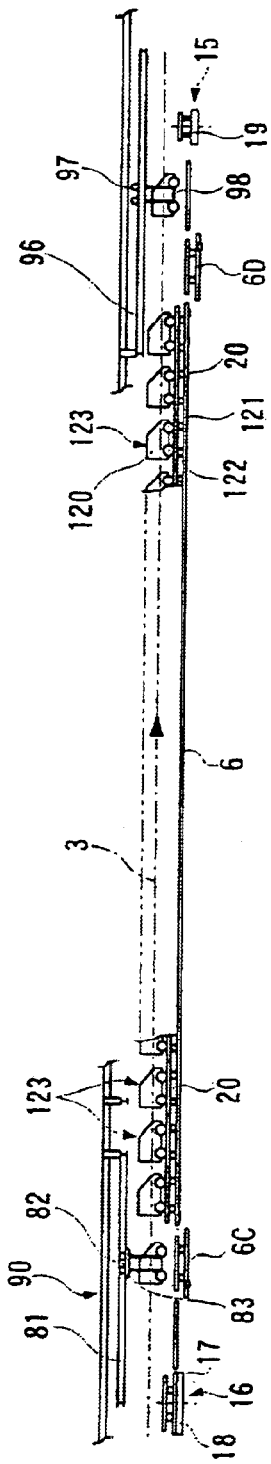

CONVEYANCE APPARATUS

BACKGROUND OF THE INVENTION

1. Field of the Invention

The present invention relates to a conveyance apparatus employed in an assembly line for automobiles (vehicles).

2. Description of the Related Art

In the prior art, a composition has been proposed which comprises a carriage conveyance apparatus for supporting and conveying a vehicle body prior to assembly of the vehicle wheels, as disclosed in Japanese Utility Model No. 59-2865, and a slat conveyor apparatus for supporting and conveying an automobile after assembly of the vehicle wheels, by means of the wheels, as disclosed in Japanese Patent Publication No. 61-60002.

However, according to the conventional configuration described above, the carriage conveyance apparatus and the slat conveyor have mutually independent forms and do not have any common constituent elements. Hence, the overall cost of the assembly line becomes expensive. Moreover, since a path for returning the empty carriages has to be formed in the carriage conveyance apparatus, then not only does the apparatus become expensive, but problems also arise in that the installation surface area of the apparatus also increases, and the like.

SUMMARY OF THE INVENTION

It is an object of the present invention to provide a conveyance apparatus whereby the overall cost can be reduced and the installation surface area can be constricted, by using common constituent elements for the conveyance of conveyance objects prior to assembly and the conveyance of the conveyance objects after assembly.

In order to achieve the aforementioned objects, the conveyance apparatus of the present invention includes attachable and detachable supporting members capable of supporting a conveyance object prior to processing, and a fixed supporting member capable of supporting the conveyance object after processing in a state where the attachable and detachable supporting members have been detached, each provided on the upper portion of a movable body capable of moving over a fixed path. Accommodating sections capable of accommodating the attachable and detachable supporting members, when detached, are provided in the movable body.

According to the configuration of the present invention described above, it is possible to perform conveyance in a state where a conveyance object prior to processing is supported by the attachable and detachable supporting members, by causing the attachable and detachable supporting members to be attached to the top of the movable body. Thereupon, by detaching the attachable and detachable supporting members and accommodating the same, it is possible to perform conveyance in a state where the conveyance object after processing is supported by the fixed supporting member. Thereby, the conveyance of the conveyance object prior to processing and the conveyance of the conveyance object after processing can be performed by using common movable bodies. Hence, the overall apparatus can be composed inexpensively, in addition to which return paths, and the like, for the detachable supporting members are unnecessary, the installation surface area can be reduced.

In a first embodiment of the conveyance apparatus according to the present invention, the fixed path comprises a first stage path section in which the attachable and detachable supporting members are attached and a final stage path section in which the attachable and detachable supporting members are detached, wherein the first stage path section has a start section provided with an attaching device for taking out the attachable and detachable supporting members accommodated inside the accommodating sections and attaching the taken out supporting members on top of the movable body. A first stage loading device is provided for causing a conveyance object prior to processing to be supported on the attached attachable and detachable supporting members. The first stage path section has an end section provided with a first stage removing device for removing the conveyance object prior to processing from the attachable and detachable supporting members, and an accommodating device for causing the attachable and detachable supporting members having been emptied to be accommodated in the accommodating sections. The final stage path section has a start section provided with a final stage loading device for causing the conveyance object after processing to be supported on the fixed supporting member. The final stage path section has an end section provided with a final stage removing device for removing the conveyance object after processing from the upper portion of the fixed supporting member.

According to this first embodiment, in the start section of the first stage path section, after the attachable and detachable supporting members accommodated in the accommodating sections have been attached to the top of the movable body by the attaching device, it is possible for a conveyance object prior to processing to be loaded onto the attachable and detachable supporting members thus attached, by means of the first stage loading device. In the end section of the first stage path section, after the conveyance object prior to processing has been removed and conveyed away from the attachable and detachable supporting members, by means of the first stage removing device, it is possible for the attachable and detachable supporting members which have not been emptied to be accommodated in the accommodating sections by the accommodating device. Moreover, in the start section of the final stage path section, it is possible for the conveyance object after processing to be loaded onto the fixed supporting member, and in the end section of the final stage path section, it is possible for the conveyance object after processing to be removed and conveyed away from the fixed supporting member, by means of the final stage removing device.

In a second embodiment of the conveyance apparatus according to the present invention, the fixed path is laid out in an endless fashion by means of a mutually parallel first stage path section and final stage path section, and a pair of conveyance path sections for conveying the movable body between the start and end of the respective path sections, wherein a processing path is provided in which the first stage removing device and the final stage loading device can act.

According to this second embodiment, in the end section of the first stage path section, after a conveyance object prior to processing has been removed and conveyed away from attachable and detachable supporting members, the movable body with the attachable and detachable supporting members accommodated inside the accommodating sections can be conveyed to the end section of the final stage path section, via a conveyance path section. A conveyance object prior to processing removed from the attachable and detachable supporting members by means of the first stage removing device is subjected to prescribed processes while traveling along the processing path, whereupon it can be transferred to the final stage loading device as a conveyance object after processing, and hence can be loaded onto a movable object transferred to the end section of the final stage path section. Moreover, in the end section of the final stage path section, the movable body which has been emptied by removing the conveyance object after processing from the fixed supporting member can be conveyed to the start section of the first stage path section, via the conveyance path section.

In a third embodiment of the conveyance apparatus according to the present invention, the conveyance object is a vehicle having a vehicle body supported by the attachable and detachable supporting members prior to assembly of vehicle wheels, and the vehicle wheels are supported on the fixed supporting member after having been assembled.

According to this third aspect of the invention, by attaching the attachable and detachable supporting members on top of the movable body, it is possible to perform conveyance of a light-weight vehicle body prior to the assembly of the wheels can be supported while being stably supported by the attachable and detachable supporting members. Moreover, by detaching the attachable and detachable supporting members and accommodating them in the accommodating sections, it is possible to perform conveyance of a vehicle which has become heavy after the assembly of the vehicle wheels, while the vehicle body is being supported stably via the vehicle wheels by the fixed supporting member. Thus, the present invention can be suitably applied to an assembly line for vehicles (automobiles).

BRIEF DESCRIPTION OF THE DRAWINGS

FIG. 3(a) is a schematic side view of the path in the conveyance apparatus illustrating a first stage path section.

FIG. 3(b) is a schematic side view of the path in the conveyance apparatus illustrating a processing path section.

FIG. 3(c) is a schematic side view of the path in the conveyance apparatus illustrating a final stage path section.

DESCRIPTION OF THE PREFERRED EMBODIMENTS

Below, an embodiment of the present invention is described with reference to the drawings, in a configuration where it is applied to an assembly line for vehicles (automobiles). In the following description, a vehicle body 120 prior to assembly processing is shown as one example of a conveyance object prior to processing, and a vehicle 123 wherein front wheels (vehicle wheels) 121 and rear wheels (vehicle wheels) 122, and the like, have been assembled onto a vehicle body 120, is shown as one example of a conveyance object after processing.

Figure 2:
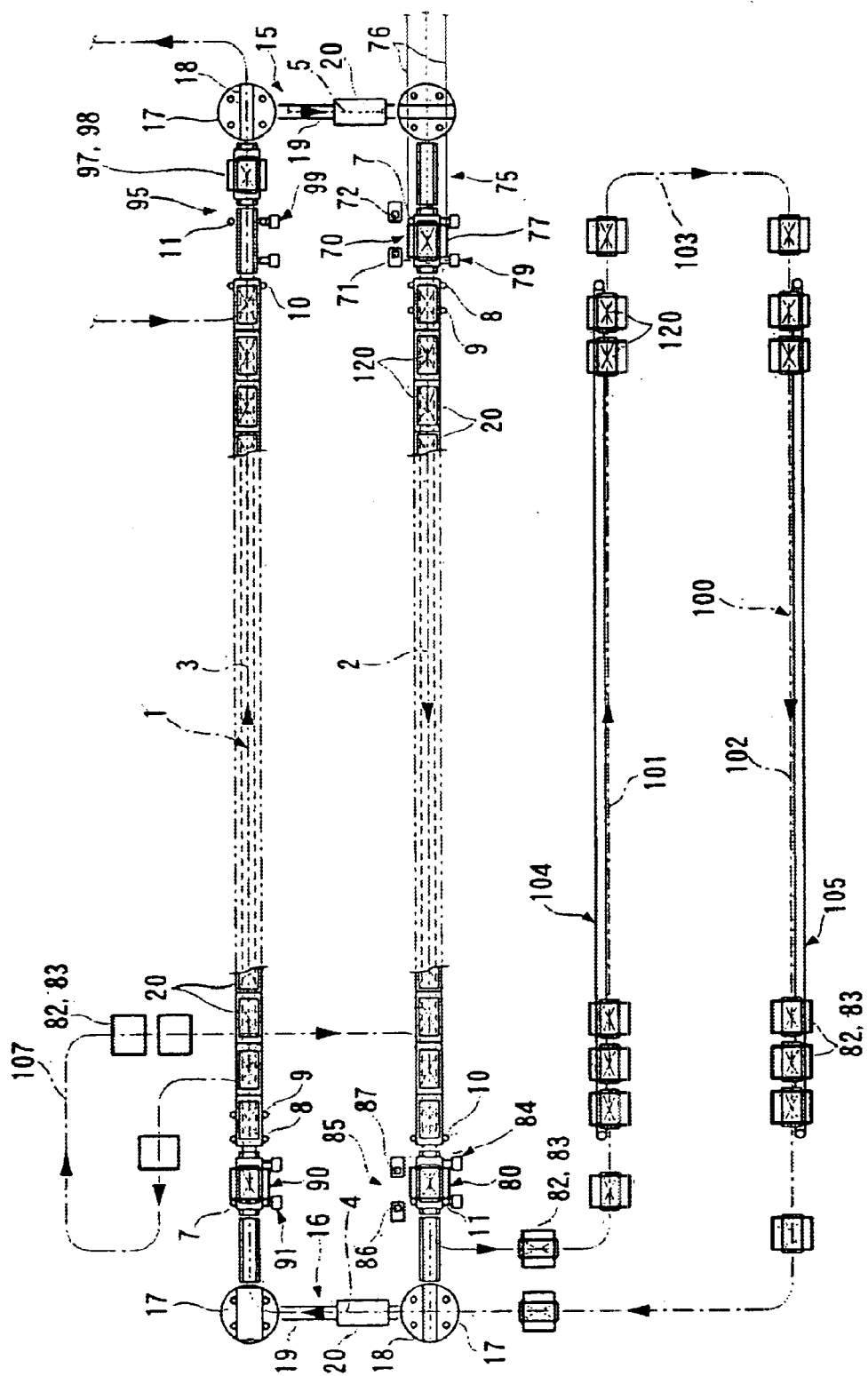
FIG. 2 is an schematic plan view showing the path in the conveyance apparatus.

In FIG. 2 and FIG. 3, a fixed path 1 along which a movable body 20 can travel is arranged in an endless fashion, by means of a first stage path section 2 and a final stage path section 3, disposed respectively in parallel, a first conveyance path section 4 for conveying a movable body 20 between the end of the first stage path section 2 and the start of the final stage path section 3, and a second conveyance path section 5 for conveying a movable body 20 between the end of the final stage path section 3 and the start of the first stage path section 2. Here, the first stage path section 2 and the final stage path section 3 are provided by laying a pair of left and right-hand rail members 6 on the floor.

Figure 1:
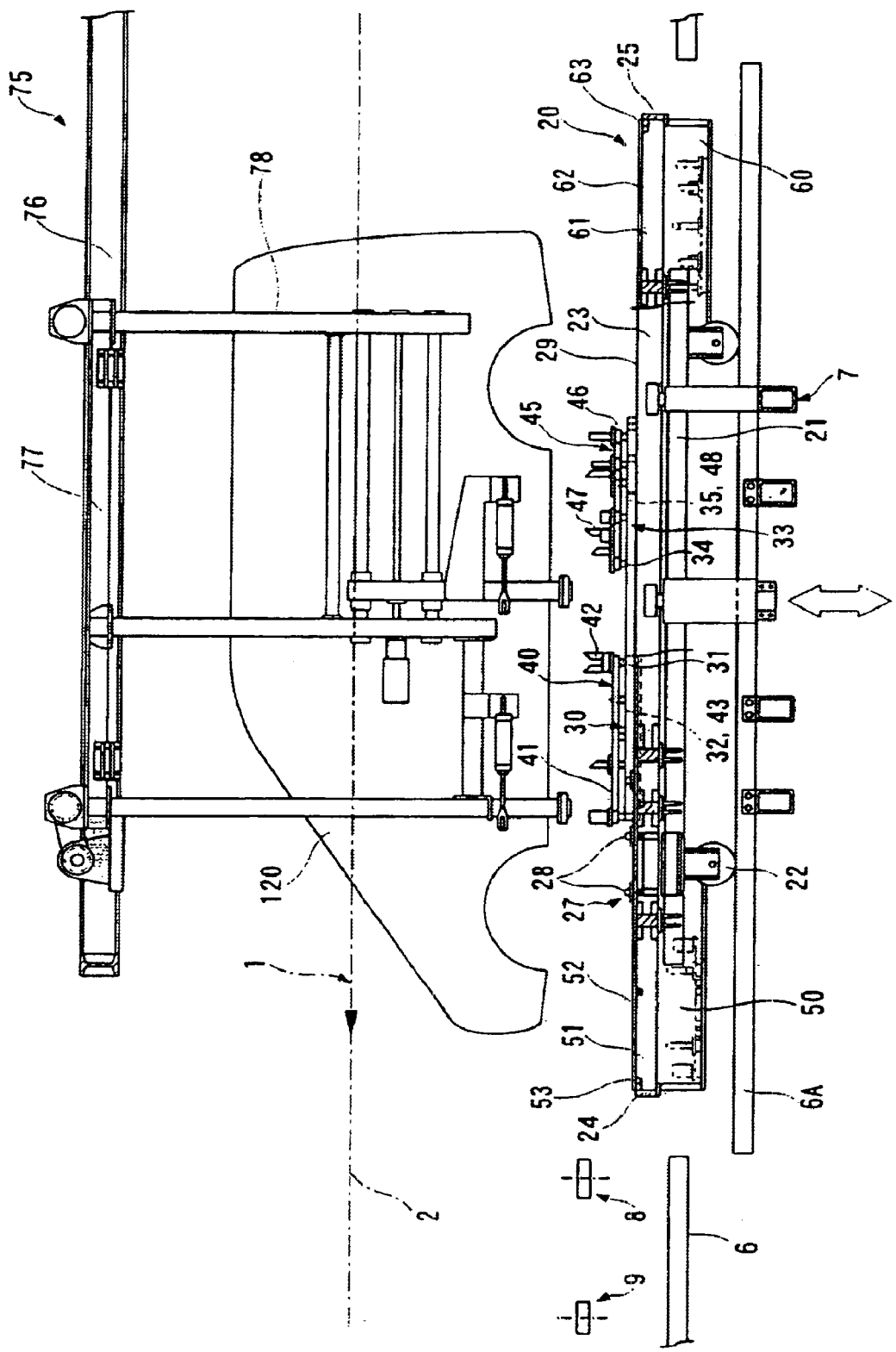
FIG. 1 is a partially cutaway side view of a first stage loading device section of a conveyance apparatus.
Figure 4:
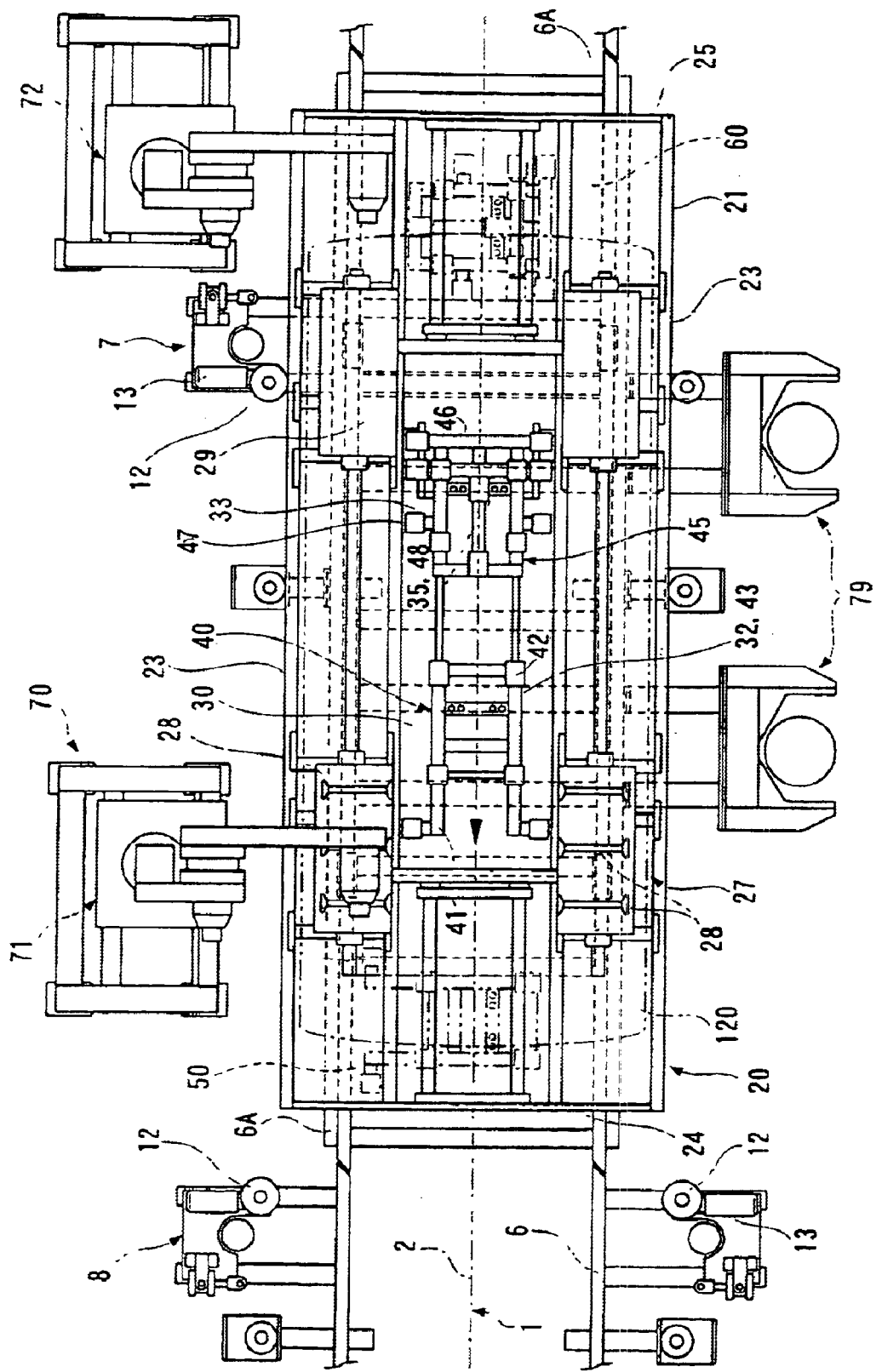
FIG. 4 is a plan view of a first stage loading device section in the conveyance apparatus.
Figure 7:
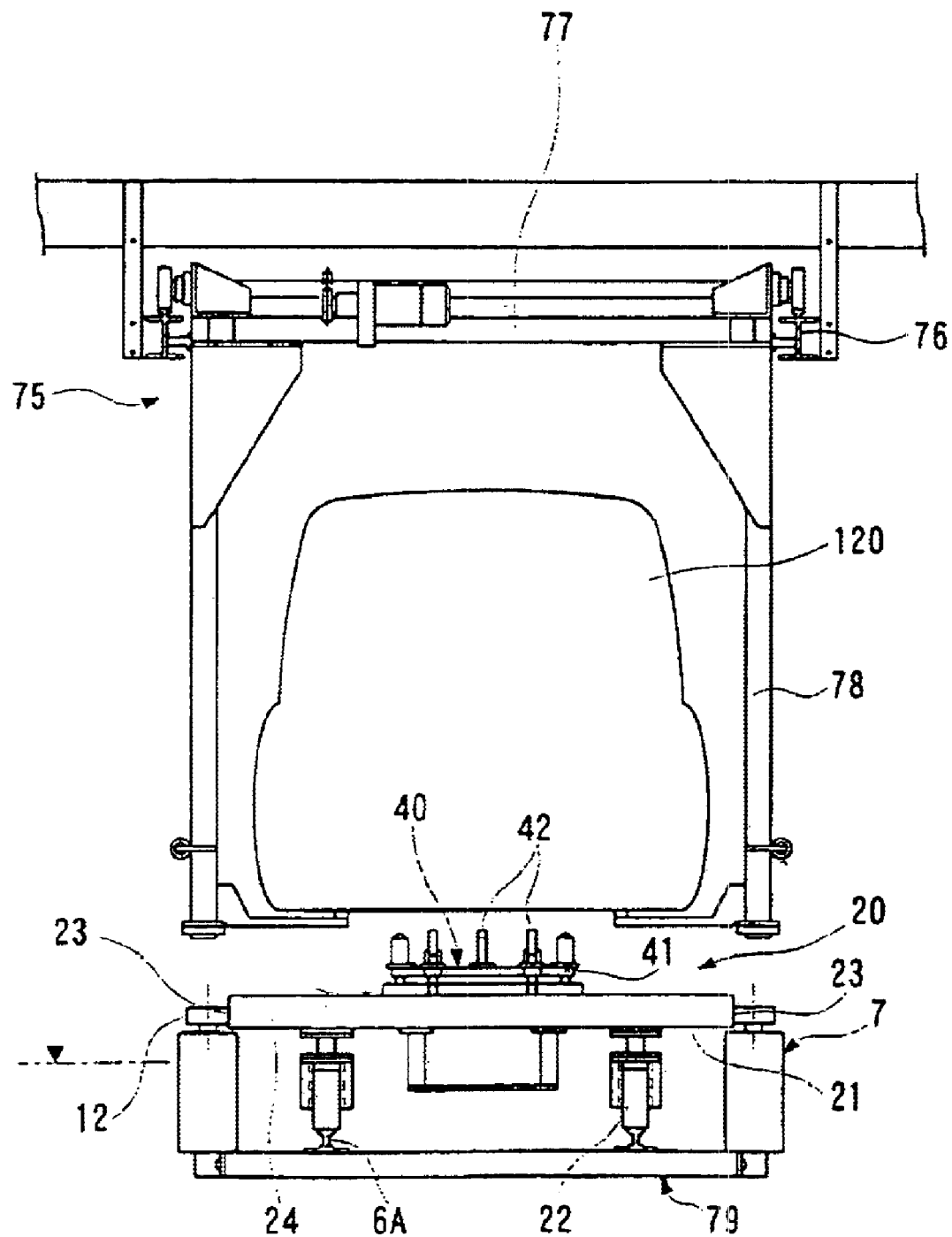
FIG. 7 is a front view of the first stage loading device section of the conveyance apparatus when a vehicle body is introduced.

In FIG. 1, FIG. 4 and FIG. 7, the main body 21 of the movable body 20 is formed in a flat, square frame shape, wheels 22 being provided in an idly rotatable fashion on the under side thereof, respectively, at the front and rear ends on both the left and right-hand sides, and the wheels 22 are supported and guided by the rail members 6, whereby the movable body 20 is able to move along the first stage path section 2 and the final stage path section 3. Here, both side faces of the main body 21 are formed into passive faces (one example of passive sections) 23, and the front and rear faces thereof are formed into abutting faces 24, 25.

Attachable and detachable supporting members 40, 45 capable of supporting a vehicle body 120, and a fixed supporting member 27 capable of supporting a vehicle 123 in a state where the attachable and detachable supporting members 40, 45 have been removed, is provided on the upper portion of the movable body 20. In other words, two locations at the front and the rear of the upper portion of the movable body 20 are formed into attachment sections 30, 33. Receiving bodies 31, 34 capable of supporting the attachable and detachable supporting members 40, 45 are provided respectively in a plurality of distributed locations in the attachment sections 30, 33, and engaging pin bodies 32, 35 are provided in a standing manner respectively in a distributed fashion on the left and right-hand sides of the attachment sections 30, 33, in the intermediate portion thereof in the longitudinal direction.

The attachable and detachable supporting members comprise a front attachable and detachable supporting member 40 and a rear attachable and detachable supporting member 45, the base frame bodies 41, 46 of these attachable and detachable supporting members 40, 45 being constituted in such a manner that they can be mounted onto the receiving bodies 31, 34 of the attachment sections 30, 33. Vehicle body supporting bodies (supporting bodies) 42, 47 are provided respectively in prescribed locations on the base frame bodies 41, 46, and engagable tubular bodies 43, 48 which are capable of engaging with the engaging pin bodies 32, 35 from above, are provided in the vertical direction on the base frame bodies 41, 46, in an intermediate portion thereof in the longitudinal direction.

The fixed supporting member 27 is constituted by an engaging section 28 provided extending towards the forward side from the front attachment section 30, and a receiving section 29 provided extending towards the rear side from the rear attachment section 33. Here, the engaging section 28 is configured in such a manner that the front wheels 121 of a vehicle 123 can be engaged therein, and is arranged in such a manner that when a wheel is engaged therein it adopts one of two engagement positions (or one position or more than two positions), in accordance with the length of different vehicle models. Moreover, the receiving section 29 is capable of receiving the rear wheels 122 of a vehicle 123, and is constituted by using the upper face of the main body 21 (see FIG. 12).

A front side accommodating section 50 and a rear side accommodating section 60 capable of accommodating the attachable and detachable supporting members 40, 45 when detached, are provided in the movable body 20. In other words, accommodating sections 50, 60 respectively having upper faces formed into opening sections 51, 61, are formed in a box shape on the front section and rear section of the main body 21. Lid members 52, 62 capable of opening and closing the opening sections 51, 61 are provided swingably via hinges 53, 63, and opening and closing operation sections 54, 64 are provided on the lid members 52, 62. Moreover, opening restriction bodies 55, 65 are provided between the accommodating sections 50, 60 and the lid members 52, 62, and these opening restriction bodies 55, 65 are constituted by sliding link mechanisms (see dotted lines in FIG. 5).

Here, the front side accommodating section 50 is provided so as to be able to accommodate the front side attachable and detachable supporting member 40 when the orientation thereof is changed through 90°, and the rear side accommodating section 60 is provided so as to be able to accommodate the rear side attachable and detachable supporting member 45 when the orientation thereof is changed through 90°. The lid members 52, 62 are composed in such a manner that they open in an outward direction, towards the front and rear sides.

Figure 11:
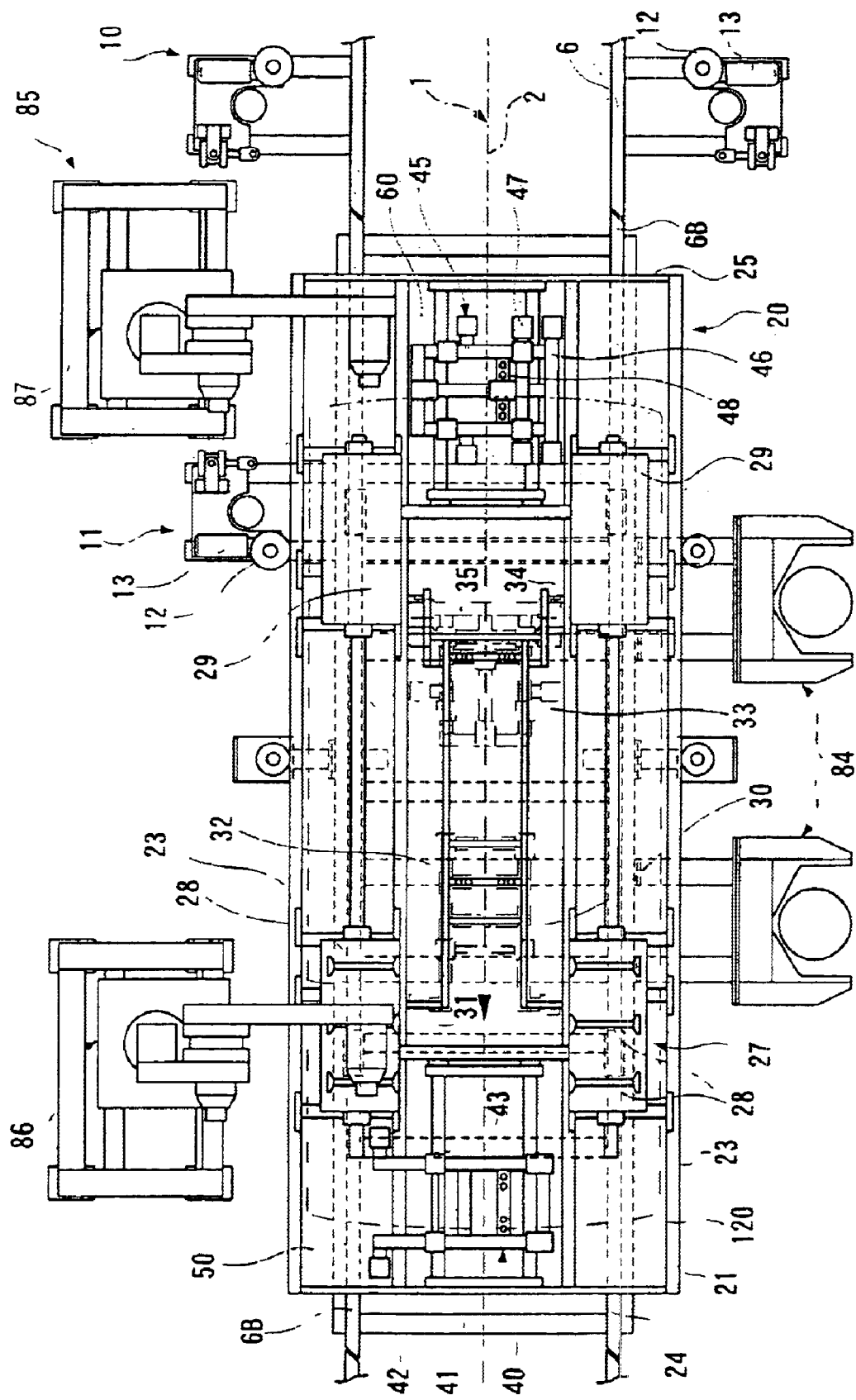
FIG. 11 is a plan view of the first stage removing device section of the conveyance apparatus.

In FIG. 2, FIG. 4 and FIG. 11, an incorporating device 7 is provided at the start section of the first stage path section 2 and the final stage path section 3, and an ejecting device 8 and feeding device 9 are provided slightly downstream from the incorporating device 7. Moreover, a braking device 10 is provided at the end section of the first stage path section 2 and the final stage path section 3, and an ejecting device 11 is provided slightly downstream from the braking device 10. These devices 7 to 11 all have similar structures, abutting the passive faces 23 of the main body 21 from the side directions thereof, and are constituted, for example, by a pair of rollers 12 made of polyurethane, and a rotary drive device 13, or the like, which imparts a rotary feeding force in conjunction with these rollers 12.

Figure 9:
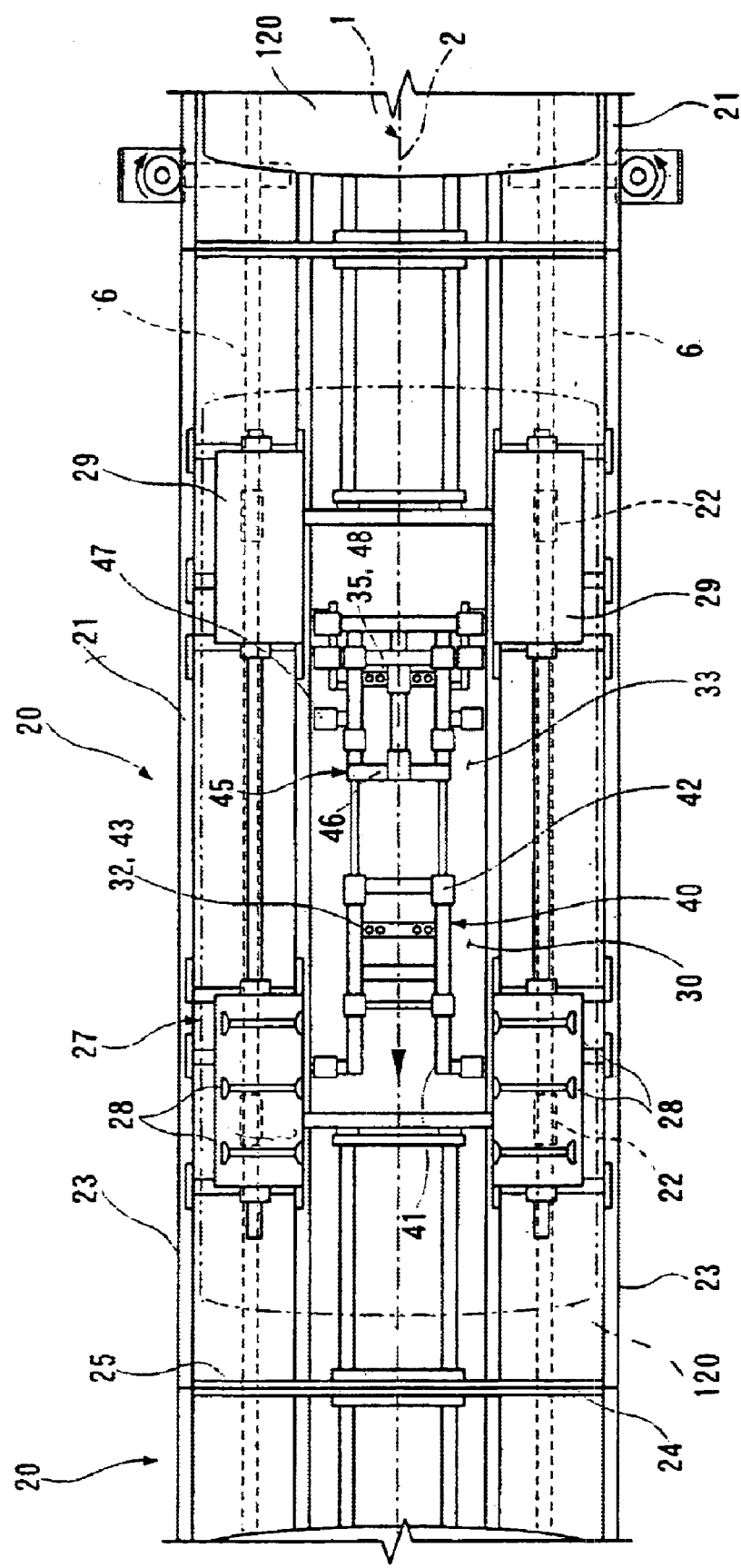
FIG. 9 is a plan view of the first stage path section of the conveyance apparatus.

The rotary drive device 13 of the braking device 10 is constituted by a torque motor, and the rotary drive devices 13 of the other devices 7 to 9, 11 are constituted by induction motors. The rotary feeding force B of the braking device 10 is set so as to be less than the rotary feeding force A of the feeding device 9, in other words, in such a manner that A>B. Therefore, in the first stage path section 2 and final stage path section 3, a composition is achieved wherein a plurality of movable bodies 20 travel in an aligned state between the feeding device 9 and the braking device 10, while being pressed tightly from the rear side in a state where the respective front and rear abutting sections 24, 25 make mutual contact, in such a manner that no gaps occur between the front and rear ends thereof, in other words, as shown in FIG. 9.

In FIG. 2 and FIG. 3, the first conveyance path section 4 and the second conveyance path section 5 are constituted by a first transfer device 15 which opposes the start of the first stage path section 2 and the final stage path section 3, a second transfer device 16 which opposes the end of the first stage path section 2 and the final stage path section 3, and intermediate rail members 19, and the like, disposed between the respective transfer devices 15, 16. The transfer devices 15, 16 have similar structures, and are constituted by rotating tables which turn about a vertical axis, and a loading rail member 18, or the like, laid on each rotating table 17. Here, the loading rail member 18 is constituted so as to be able to connect with the intermediate rail member 19 and the rail members 6 of the first stage path section 2 and final stage path section 3.

Consequently, a composition is achieved wherein, by connecting the loading rail member 18 to the rail member 6, by rotating the rotating table 17, a movable body 20 can be conveyed into the first stage path section 2 or the final stage path section 3, or out from same. Moreover, a composition is also achieved wherein, by connecting the loading rail member 18 to the intermediate rail member 19 by rotating the rotating table 17, a movable body 20 can be moved from the second transfer device 16 to the first transfer device 15, via the intermediate rail member 19. A moving device for the movable bodies 20 and a table rotating device, and the like, are provided in a portion of the first conveyance path section 4 and the second conveyance path section 5. Here, a composition similar to that of the feeding device 9 described above, or the like, is adopted for the moving device for the movable bodies 20.

The first stage path section 2 of the fixed path 1 is composed in such a manner that movable bodies 20 fitted with attachable and detachable supporting members 40, 45 can travel along same, and the final stage path section 3 is composed in such a manner that movable bodies 20 from which the attachable and detachable supporting members 40, 45 have been removed can travel along same. In the start section of the first stage path section 2, there are provided an attaching device 70 which takes out the attachable and detachable supporting members 40, 45 accommodated in the accommodating sections 50, 60, and attaches them on top of the movable body 20, and a first stage loading device 75 which causes a vehicle body 120 to be supported on the attachable and detachable supporting members 40, 45 thus attached.

In other words, as illustrated in FIG. 1 to FIG. 7, the attaching device 70 consists of two automatic attaching devices (robots) 71, 72, or the like, which are operated respectively in a mutually independent fashion in such a manner that they take out the attachable and detachable supporting members 40, 45 accommodated in the accommodating sections 50, 60 corresponding to them, turn same through 90° (reverse the orientation thereof), and subsequently attach same on the attachment sections 30, 33 of the movable body 20. The lid members 52, 62 are opened before the attachable and detachable supporting members 40, 45 are taken out, and are closed after the attachable and detachable supporting members 40, 45 have been taken out and before the attachable and detachable supporting members 40, 45 are attached on the attachment sections 30, 33, the opening and closing operation being performed via the opening and closing operation sections 54, 64, by means of manual operation or automatically (mechanically).

The first stage loading device 75 is a suspended conveyor structure which is constituted by a movable part 77 capable of reciprocal movement following over the first stage path section 2 while being supported and guided on a pair of left and right-hand ceiling-side rails 76, and a hanger part 78 provided on the lower part of the movable part 77, and the like, in such a manner that a vehicle body 120 can be supported by the hanger part 78. The rail member 6 is formed into a split rail section 6A at the location where the attaching device 70 is provided, and furthermore, the split rail section 6A is composed in such a manner that it can be raised and lowered by means of a lift device 79. The split rail section 6A is set to a length which allows one movable body 20 to be supported thereon. Furthermore, a driving device for causing reciprocal movement is mounted on the movable part 77.

Consequently, after a vehicle body 120 conveyed via another conveyance path has been taken up onto the hanger part 78, the vehicle body 120 is then moved onto the movable body 20 supported on the lowered split rail section 6A, by means of an advancing movement of the movable part 77. Thereupon, by raising the movable body 20 together with the split rail section 6A by means of the lift device 79, the vehicle body 120 becomes supported via the vehicle body supporting bodies 42, 47 of the attached attachable and detachable supporting members 40, 45, while being lifted off from the hanger part 78. Subsequently, after the movable part 77 has been withdrawn, the movable body 20 is lowered together with the split rail section 6A by means of the lift device 79. Thereby, the vehicle body 120 can be loaded onto the attached attachable and detachable supporting members 40, 45 by means of the first stage loading device 75.

As shown in FIG. 2, FIG. 3, FIG. 10 and FIG. 11, a first stage removing device 80 for removing the vehicle body 120 from the attachable and detachable supporting members 40, 45, and an accommodating device 85 for causing the empty attachable and detachable supporting members 40, 45 to be accommodated inside the accommodating sections 50, 60, are disposed in the end section of the first stage path section 2.

In other words, the first stage removing device 80 is a suspended conveyor structure which is used conjointly for the final stage removing device and processing path, and is constituted by a movable part 82 capable of movement following over the first stage path section 2 while being supported and guided by a single ceiling-side rail 81, and a hanger part 83 provided below the movable part 82, or the like, in such a manner that the vehicle body 120 can be supported by means of the hanger part 83.

In the end section of the first stage path section 2, the rail member 6 is formed into a split rail section 6B, and this split rail section 6B is composed in such a manner that it can be raised and lowered by means of the lift device 84. The split rail section 6B is set to a length that allows one movable body 20 to be supported thereon. Moreover, a driving device for generating movement is mounted on the movable part 82.

The accommodating device 85 consists of two automatic accommodating devices (robots) 86, 87, which are operated respectively in a mutually independent manner, in such a manner that they detach the attachable and detachable supporting members 40, 45 attached on the attachment sections 30, 33 of the movable body 20, turn same through 90°, and then cause same to be accommodated in the corresponding accommodating sections 50, 60.

Therefore, after a movable body 20 which has moved along the first stage path section 2 while supporting a vehicle body 120 has halted over the lowered split rail section 6B, it is then raised together with the split rail section 6B, by means of a lift device 84. After the hanger part 83 has adopted a position in which it can engage with the vehicle body 120, by means of an advancing movement of the movable part 82, the movable body 20 is lowered, together with the split rail section 6B, by means of the lift device 84, whereby the vehicle body 120 is caused to engage with the hanger part 83. Thereupon, the vehicle body 120 is conveyed off by the hanger part 83, by means of the advancing movement of the movable part 82. Thereby, the vehicle body 120 which was supported on the attachable and detachable supporting members 40, 45, can be removed and conveyed by the first stage removing device 80.

Thereupon, the attachable and detachable supporting members 40, 45 which are now empty are caused to be accommodated inside the accommodating sections 50, 60, by means of an accommodating device 85. In other words, after the vehicle body 120 has been conveyed out, two automatic accommodating devices 86, 87 are operated independently, thereby detaching the corresponding attachable and detachable supporting members 40, 45 from the movable body 20. After the attachable and detachable supporting members 40, 45 have been turned through 90° by the respective automatic accommodating devices 86, 87 in a state where the lid members 52, 62 are open, they are then caused to be accommodated in the corresponding accommodating sections 50, 60. Once this accommodating operation has been carried out, the lid members 52, 62 are closed. The opening and closing operation of the lid members 52, 62 via the opening and closing operation sections 54, 64 is carried out by manual operation or by automatic operation (mechanically).

Figure 12:
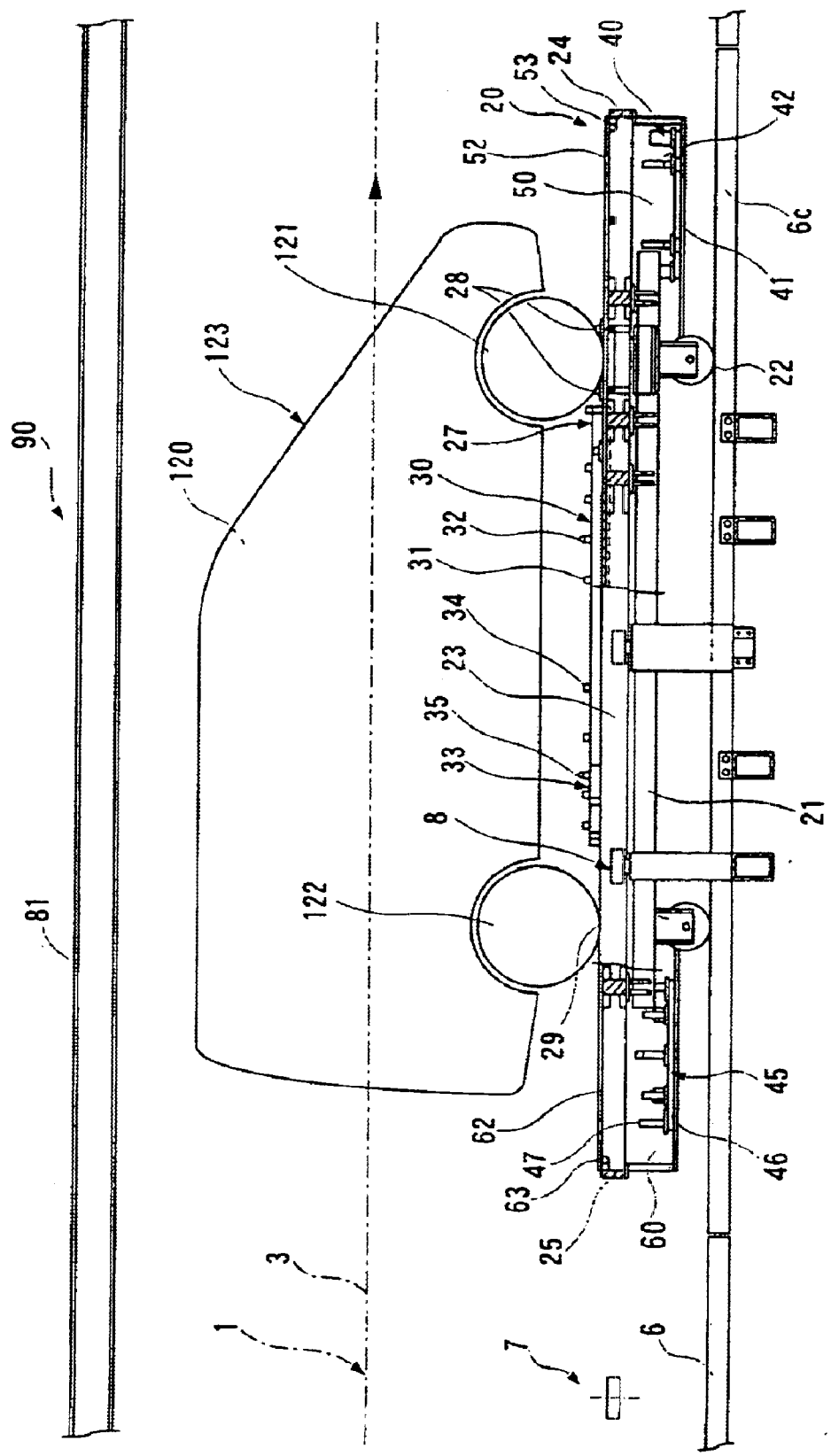
FIG. 12 is a partially cutaway side view of the final stage path section of the conveyance apparatus.

As shown in FIG. 2, FIG. 3 and FIG. 12, a final stage loading device 90 which causes a vehicle 123 to be supported on the fixed supporting member 27 is provided at the start of the final stage path section 3. In other words, the final stage loading device 90 is a suspended conveyor structure, which is constituted by using a ceiling-side rail 81 as described above, and a movable part 82 and hanger part 83, and the like, capable of movement following over the final stage path section 3. In the start section of the final stage path section 3, the rail member 6 is formed into a split rail section 6C, and this split rail section 6C is composed in such a manner that it can be raised and lowered by means of a lift device 91. The split rail section 6C is set to a length that allows one movable body 20 to be supported thereon.

Consequently, after a movable part 82 which has moved along over the final stage path section 3 while supporting a vehicle 123 has been halted over the split rail section 6C, an empty movable body 20 halted over the lowered split rail section 6C is raised up together with the split rail section 6C, by means of a lift device 91. Thereby, the engaging section 28 engages with the front wheels 121 from below, and furthermore, the receiving section 29 abuts against the rear wheels 122 from below, whereby the vehicle 123 is supported while being taken off from the hanger part 83. Thereupon, after the movable part 82 has been advanced, the movable body 20 is lowered, together with the split rail section 6C, by means of the lift device 91. Accordingly, the vehicle 123 can be loaded onto the fixed supporting member 27, via the front wheels 121 and the rear wheels 122, by means of the final stage loading device 90.

A final stage removing device 95 for removing the vehicle 123 from the fixed supporting member 27 is provided in the end section of the final stage path section 3. In other words, the final stage removing device 95 is constituted by a movable part 97 capable of movement following over the final stage path section 3 while being supported and guided by a ceiling-side rail 96, and a hanger part 98 provided in the lower portion of the movable part 97, and the like, in such a manner that a vehicle 123 can be supported by this hanger part 98.

In the end section of the final stage path section 3, the rail member 6 is formed into a split rail section 6D, and the split rail section 6D is composed in such a manner that it is raised and lowered by means of a lift device 99. This split rail section 6D is set to a length that allows one movable body 20 to be supported thereon. Furthermore, a drive device for generating movement is mounted on the movable part 97.

Therefore, after a movable body 20 which has moved along the final stage path section 3 while supporting a vehicle 123 has halted over the lowered split rail section 6D, it is raised together with the split rail section 6D, by means of the lift device 99. When the hanger part 98 has assumed a position in which it can engage with the vehicle body 123 by the advancing movement of the movable part 97, the movable body 20 is lowered, together with the split rail section 6D, by the lift device 99, and the vehicle 123 is thereby caused to engage with the hanger part 98. Thereupon, the vehicle 123 is conveyed off via the hanger part 98, by the advancing movement of the movable part 97. Consequently, the vehicle 123 that was supported on the fixed supporting member 27 is taken off and conveyed by the final stage removing device 95.

As shown in FIG. 2 and FIG. 3, a processing path 100 in which the first stage removing device 80 and the final stage loading device 90 can operate is provided. In other words, the processing path 100 comprises a first processing path section 101 and a second processing path section 102, disposed mutually in parallel, the end of the first processing path section 101 and the start of the second processing path section 102 being connected by means of a reversing path section 103. The start of the first processing path section 101 is connected to the first stage removing device 80, and the end of the second processing path section 102 is connected to the final stage loading device 90, in addition to which the first stage removing device 80 and the final stage loading device 90 are connected by means of an intermediate path 107.

Conveyance along the processing path 100 and the intermediate path 104 is carried out by means of a suspended conveyance structure which is also used in the first stage removing device 80 and the final stage loading device 90 as described previously, this structure being constituted by a ceiling-side rail 81, a movable part 82, a hanger part 83, and the like, in such a manner that a vehicle body 120 (vehicle 123) can be supported by this hanger part 83. A first conveyance drive device 104 and second conveyance drive device 105 based on chain drive are disposed respectively along the first processing path section 101 and the second processing path section 102, a composition being adopted wherein a group of movable parts 82 are conveyed at a prescribed distance apart, by means of engaging bodies provided on the chains of the drive devices engaging with the movable parts 82.

The action of the aforementioned embodiment is described below.

In FIG. 2 and FIG. 3, an empty movable body 20 arriving at the end of the final stage path section 3 is sent to the start of the second conveyance path section 5 by the ejecting device 11. Here, in the second conveyance path section 5, the loading rail member 18 of the second transfer device 16 is connected to the rail member 6 of the final stage path section 3, and the loading rail member 18 of the first transfer device 15 is connected to the intermediate rail member 19.

Consequently, an empty movable body 20 having been ejected by the ejecting device 11 can be supported by the loading rail member 18 of the second transfer device 16. By causing the rotating table 17 of the second transfer device 16 to turn through 90° about a vertical axis, the loading rail member 18 can be connected to the intermediate rail member 19, whereby the empty movable body 20 is moved from the loading rail member 18 of the second transfer device 16, via the intermediate rail member 19, and onto the loading rail member 18 of the first transfer device 15.

Thereupon, by rotating the rotating table 17 of the first transfer device 15 through 90° about a vertical axis, the loading rail member 18 can be connected to the rail member 6 of the first stage path section 2. Thereby, after the empty movable body 20 has been moved from the loading rail member 18 of the first transfer device 15 to the rail member 6, it can then be caused to move onto the lowered split rail section 6A, as illustrated in FIG. 5, and caused to halt on this split rail section 6A.

Figure 5:
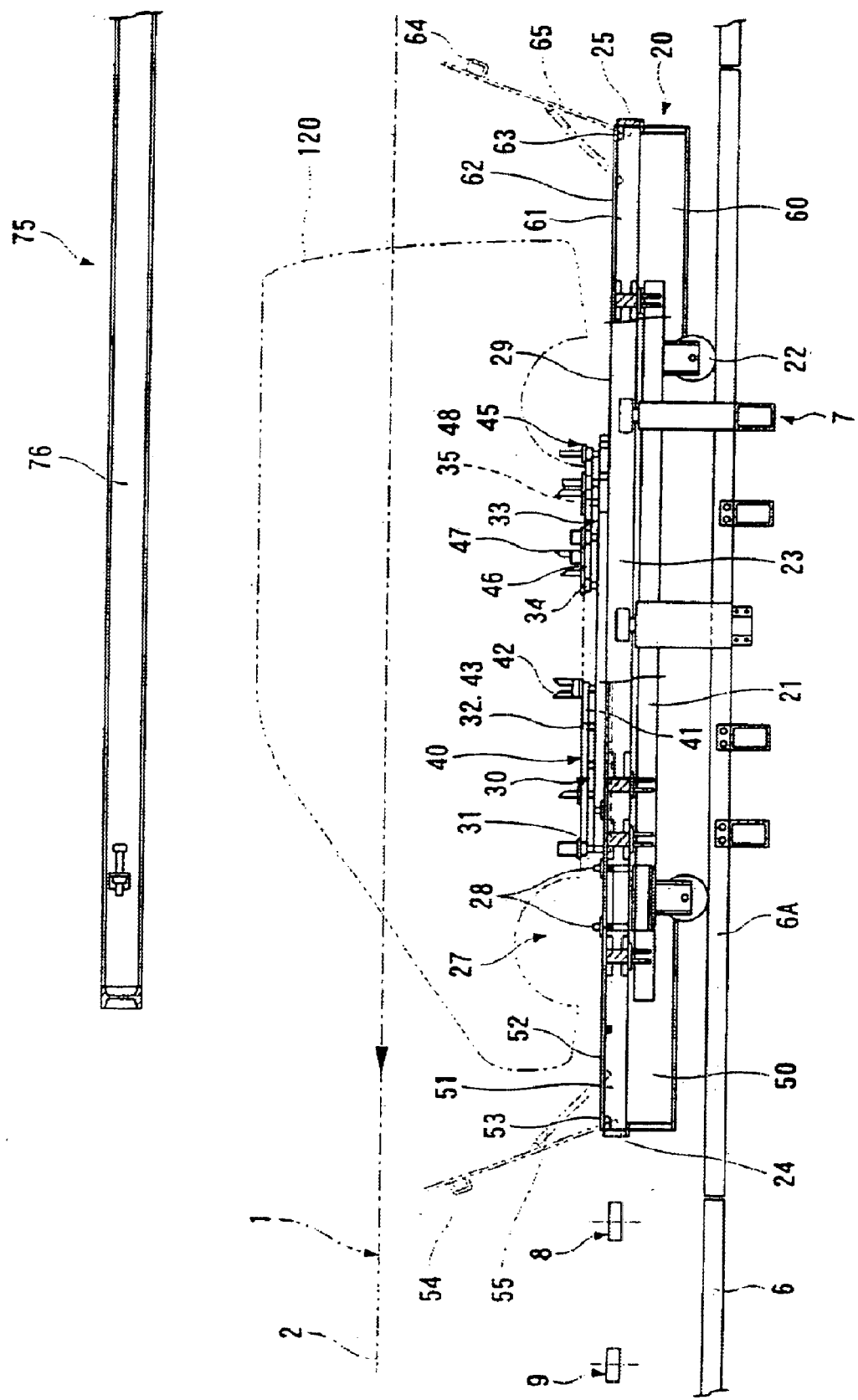
FIG. 5 is a partially cutaway side view of the first stage loading device section of the conveyance apparatus, when the attachable and detachable supporting members are attached.
Figure 6:
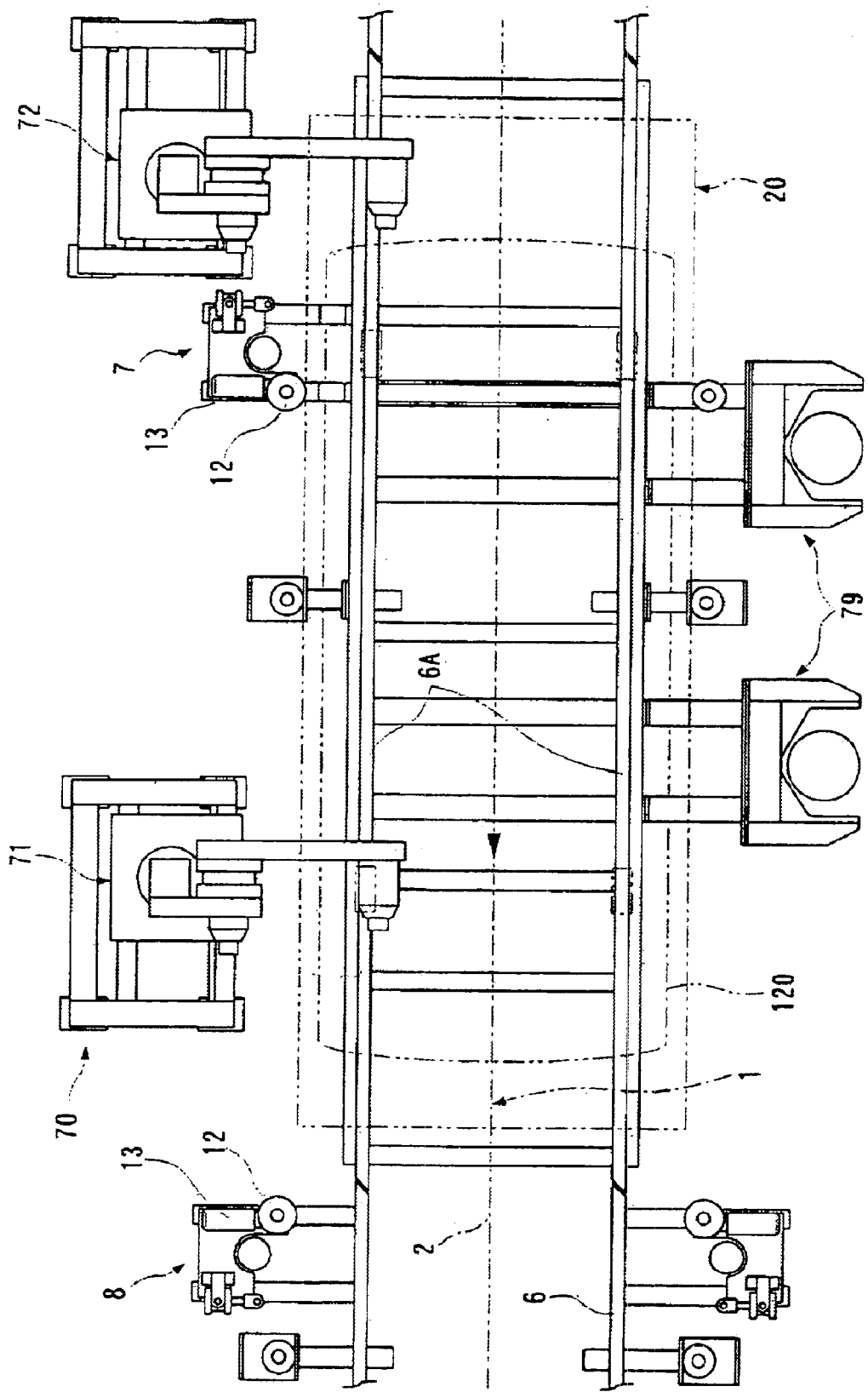
FIG. 6 is a plan view of the first stage loading device section of the conveyance apparatus.

The two automatic attaching devices 71, 72 of the attaching device 70 are then operated, thereby taking out the corresponding attachable and detachable supporting members 40, 45 accommodated inside the accommodating sections 50, 60, turning same through 90°, and then attaching same on the attachment sections 30, 33 of the movable body 20 as shown in FIG. 4 and FIG. 5. In this, the base frame bodies 41, 46 of the attachable and detachable supporting members 40, 45, are mounted on the receiving bodies 31, 34, and the engagable tubular bodies 43, 48 are caused to engage with the engaging pin bodies 32, 35 from above, whereby the attachable and detachable supporting members 40, 45 can be attached and located in precise positions.

Figure 8:
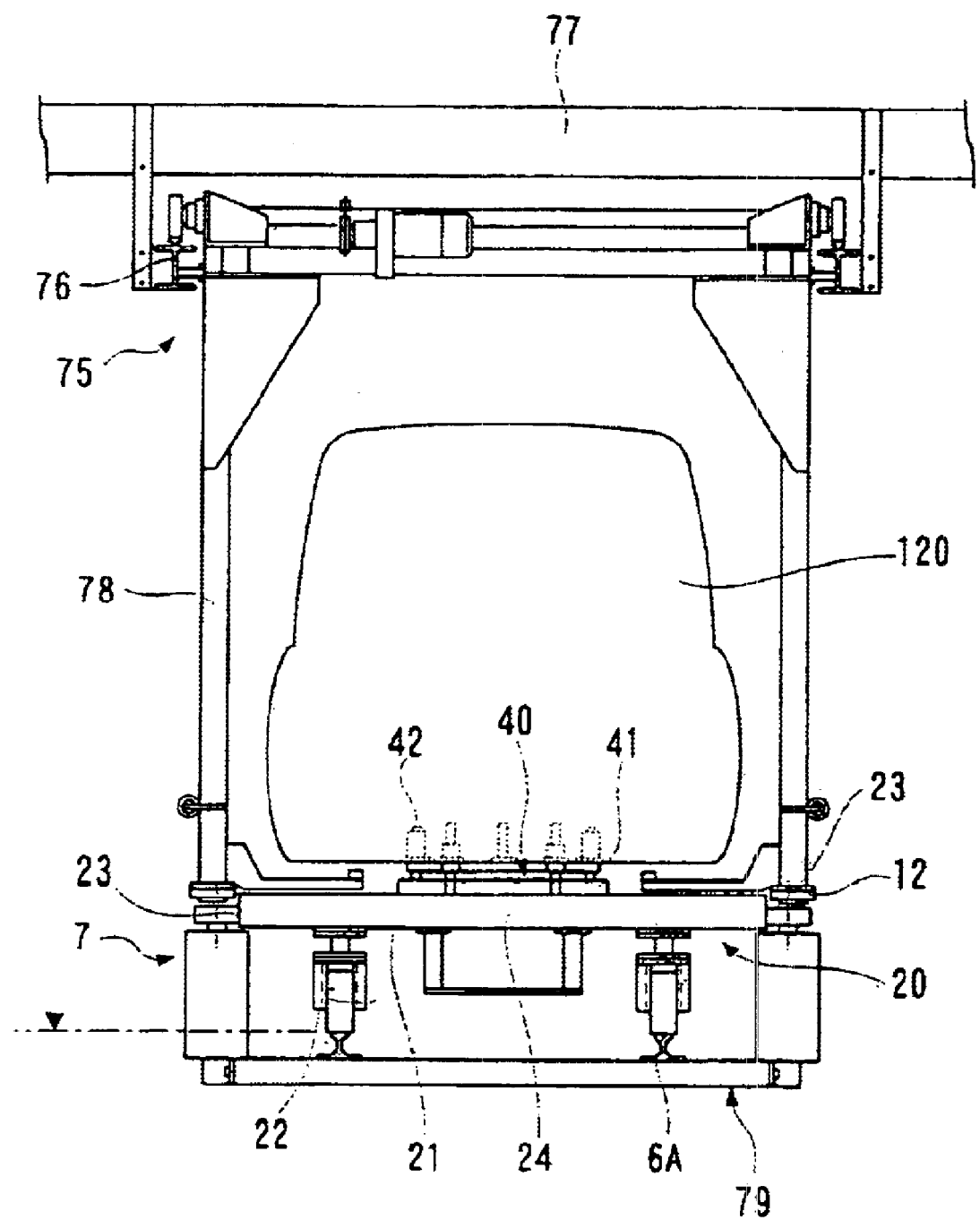
FIG. 8 is a front view of the first stage loading device section of the conveyance apparatus when a vehicle body is supported.

In this state, a movable part 77 which is carrying a vehicle body 120 in the hanger part 78 is advanced and moved to a position where the vehicle body 120 is above the movable body 20, as illustrated in FIG. 1 and FIG. 7. The movable body 20 is raised up, together with the split rail section 6A, by the lift device 79, and as illustrated in FIG. 8, the vehicle body 120 becomes supported via the vehicle body supporting bodes 42, 47 of the attachable and detachable supporting members 40, 45, while being taken up from the hanger part 78. Thereupon, after the movable part 77 has been withdrawn, the movable body 20 is lowered together with the split rail section 6A, and the split rail section 6A is connected to the rail member 6 as illustrated in FIG. 5. Thereby, the movable body 20 on the split rail section 6A can be ejected onto the rail member 6, by means of the operation of the incorporating device 7 and the ejecting device 8.

Thereupon, by means of the ejecting device 8 and the feeding device 9 acting on the movable body 20, the movable body 20 can be moved along the first stage path section 2. In the first stage path section 2, a plurality of movable bodies 20 can be moved in an aligned state between the feeding device 9 and the braking device 10, while being pressed tightly from the rear side in a state where the respective front and rear abutting sections 24, 25 make mutual contact, in such a manner that no gaps occur between the front and rear ends thereof, as shown in FIG. 9. While the movable body 20 is moved along the first stage path section 2 in this way, various tasks, such as fitting of components, and the like, are accomplished with respect to the vehicle body 120.

Prescribed tasks having been completed with respect to the vehicle body 120 and having passed through the region of the braking device 10, the movable body 20 is halted over the lowered split rail section 6B, whereupon it is raised upwards together with the split rail section 6B, by the lift device 84. When a hanger part 83 has assumed a position in which it can be engaged with the vehicle body 120, by means of the advancing movement of a movable part 82 in the first stage removing device 80, the movable body 20 is lowered together with the split rail section 6B, and the vehicle body 120 is caused to engage with the hanger part 83. Thereupon, the vehicle body 120 is conveyed out to the first processing path section 101 of the processing path 100, via the hanger part 83, by means of the advancing movement of the movable part 82.

Figure 10:
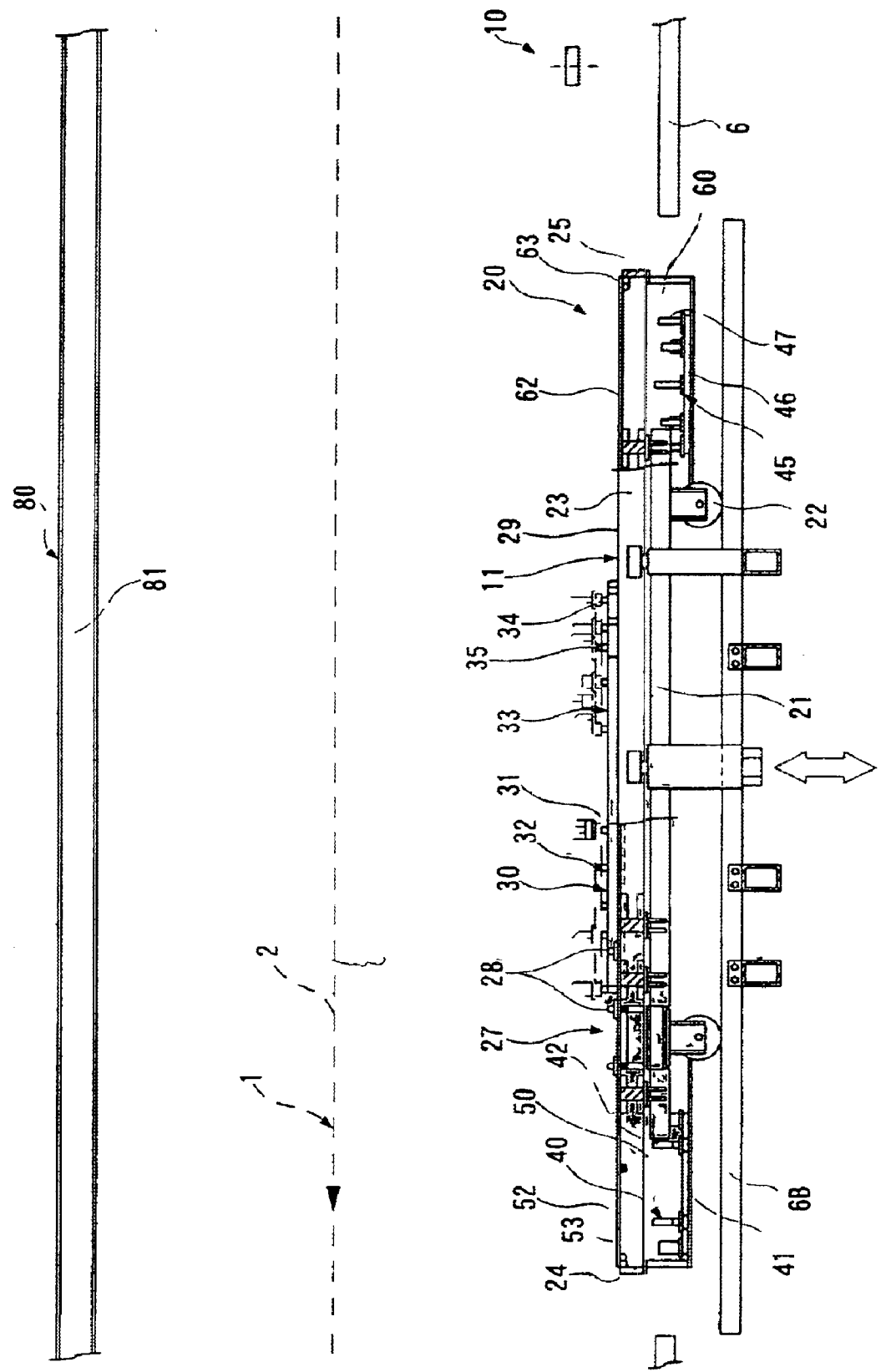
FIG. 10 is a partially cutaway side view of the first stage removing device section of the conveyance apparatus, when the attachable and detachable supporting members have been detached.

Thereupon, the automatic accommodating devices 86, 87 of the accommodating device 85 are operated, thereby detaching the corresponding attachable and detachable supporting members 40, 45 from the movable body 20, turning same through 90°, and then causing same to be accommodated inside a corresponding accommodating section 50, 60, as illustrated by the solid lines in FIG. 10 and FIG. 11. The movable body 20 having the attachable and detachable supporting members 40, 45 accommodated in this fashion is conveyed out to the start section of the first conveyance path section 4 by the ejecting device 11. In this first conveyance path section 4, similar operations to those of the second conveyance path section 5 described above are performed, whereby the empty movable body 20 can be conveyed into the start section of the final stage path section 3.

As stated above, vehicle bodies 120 that have been conveyed into the first processing path section 101 of the processing path 100 can be conveyed at prescribed intervals apart by means of the first conveyance drive device 104 engaging with and acting on the movable part 82 relating to same as shown in FIG. 2 and FIG. 3, and vehicle bodies 120 that have been conveyed into the second processing path section 102 via the reversing path section 103 can be conveyed at prescribed intervals apart by means of the second conveyance drive device 105 engaging with and acting on the movable part 82 relating to same. During travel along the first processing path section 101, various tasks are accomplished, such as fitting an engine to the vehicle body 120 from below, and during travel along the second processing path section 102, various tasks are accomplished, such as assembling (fitting) front wheels 121 and rear wheels 122 to the vehicle body 120.

A vehicle 123 which has completed prescribed assembly processes in the processing path 100 in this manner is then conveyed to the final stage loading device 90 provided at the start section of the final stage path section 3. As described above, an empty movable body 20 is conveyed into the region of the final stage loading device 90, and is caused to halt over the split rail section 6C, which is in a lowered position.

Consequently, once the movable part 82 which has arrived supporting the vehicle 123 has been halted over the split rail section 6C, the empty movable body 20 is raised upwards, together with the split rail section 6C, by means of the lift device 91, whereby the engaging section 28 is caused to engage with the front wheels 121 from below, in addition to which the receiving section 29 is caused to abut against the rear wheels 122 from below, the vehicle 123 thus becoming supported by the fixed supporting member 27 and being lifted off from the hanger part 83.

Thereupon, after the movable part 82 has been conveyed out to the intermediate path 107 by the advancing movement thereof, the movable body 20 is lowered, together with the split rail section 6C, and this split rail section 6C is connected to the rail member 6. Thereby, the movable body 20 on the split rail section 6C can be conveyed out onto the rail member 6 by the operation of the ejecting device 8.

Subsequently, in a similar fashion to the action in the first stage path section 2 described above, the movable bodies 20 can be moved along the final stage path section 3 in an aligned state while being pressed tightly from the rear side, during which time various tasks, such as fitting of components, or the like, can be accomplished with respect to the vehicle 123.

Prescribed tasks having been performed with respect to the vehicle 123 and the movable body 20 having passed through the region of the braking device 10, the movable body 20 is halted over the split rail section 6D, which is in a lowered position, and is then raised upwards, together with the split rail section 6D, by means of the lift device 99. Once a hanger part 98 has assumed a position in which it can engage with the vehicle body 120, due to the advancing movement of a movable part 97 in the final stage removing device 95, the movable body 20 is lowered, together with the split rail section 6D, and the vehicle body 120 is caused to engage with the hanger part 98. Thereupon, the vehicle 123 is conveyed out by the hanger part 98, due to the advancing movement of the movable part 97.

Thereby, the movable body 20 which is now empty reaches the end of the final stage path section 3 and by being conveyed out to the start section of the second conveyance path section 5 by the ejecting device 11, it assumes an initial state.

In the embodiment described above, a carriage type structure having wheels 22 was described as the movable body 20, but a pallet type structure may also be adopted for same, in which case the movable body is caused to travel by means of a conveyor, or the like.

The embodiment described above related to a mode wherein the rollers 12 of a plurality of devices 7 to 11 act upon the passive faces 23 in order to cause the movable body 20 to move, but another movement structure, such as drive chain, cylinder, or the like, may also be adopted.

In the embodiment described above, the front attachable and detachable supporting member 40 and the rear attachable and detachable supporting member 45 were described as attachable and detachable supporting members, but it is also possible to adopt a single attachable and detachable supporting member or a plurality of attachable and detachable supporting members numbering two or more.

The embodiment described above relates to a mode involving application to a vehicle assembly line, but a mode involving application to an assembly line for various machines, devices, or the like, may also be adopted.

The embodiment described above relates to a mode wherein a processing path 100 is arranged in which the front stage removing device 80 and the final stage loading device 90 could operate, but a mode may also be adopted in which a processing path is arranged independently, or the like.

The embodiment described above relates to a mode wherein attachment sections 30, 33 are provided in fixed positions on the main body 21, but it is also possible to adopt a mode in which the attachment sections 30, 33 are raised and lowered with respect to the main body 21, by means of a raising and lowering mechanism. In this case, the lift device may be omitted, partially or entirely.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A conveyance apparatus used in an assembly line, including a movable body capable of moving over a fixed path, the conveyance apparatus comprising:

attachable and detachable supporting members capable of supporting a conveyance object prior to processing, the supporting members being provided on an upper portion of the movable body; and a fixed supporting member capable of supporting the conveyance object after processing in a state where the attachable and detachable supporting members have been detached, the fixed supporting member being provided on the upper portion of the movable body, wherein the movable body comprises accommodating sections capable of accommodating the attachable and detachable supporting members that have been detached.

2. The conveyance apparatus according to claim 1, wherein the fixed path comprises:

a first stage path section where the attachable and detachable supporting members have been attached; and a final stage path section where the attachable and detachable supporting members have been detached, wherein the first stage path section is comprised of:

a start section provided with an attaching device for taking out the attachable and detachable supporting members accommodated inside the accommodating sections and attaching the taken out supporting members on top of the movable body, and a first stage loading device for causing a conveyance object prior to processing to be supported on the attached attachable and detachable supporting members; and an end section having a first stage removing device for removing the conveyance object prior to processing from the attachable and detachable supporting members, and an accommodating device for causing the attachable and detachable supporting members having been emptied to be accommodated in the accommodating sections, the final stage path section comprising:

a start section provided with a final stage loading device for causing the conveyance object after processing to be supported on the fixed supporting member; and an end section provided with a final stage removing device for removing the conveyance object after processing from the upper portion of the fixed supporting member.

3. The conveyance apparatus according to claim 2, wherein the fixed path is laid out in an endless fashion by comprising a mutually parallel first stage path section and final stage path section, and a pair of conveyance path sections for conveying the movable body between the start and end of the respective path sections, and wherein a processing path is provided where the first stage removing device and the final stage loading device can act.

4. The conveyance apparatus according to claim 1, wherein the conveyance object is a vehicle having a vehicle body supported by the attachable and detachable supporting members prior to assembly of vehicle wheels, and the vehicle wheels are supported on the fixed supporting member after having been assembled.

* * * * *